US 6,686,942 B2

United States Patent
Okano et al.

(10) Patent No.: US 6,686,942 B2
(45) Date of Patent: *Feb. 3, 2004

(54) MEMORY DEVICE FOR AN IMAGE FORMING APPARATUS STORING CHARACTERISTICS INFORMATION ABOUT A PROCESS CARTRIDGE DETACHABLY ATTACHABLE TO THE APPARATUS

(75) Inventors: Keiji Okano, Shizuoka (JP); Gaku Konishi, Chiba (JP); Akira Domon, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/300,594

(22) Filed: Nov. 21, 2002

(65) Prior Publication Data
US 2003/0090559 A1 May 15, 2003

Related U.S. Application Data

(62) Division of application No. 09/986,564, filed on Nov. 9, 2001, now Pat. No. 6,532,030.

(30) Foreign Application Priority Data

Nov. 16, 2000 (JP) .................................... 2000-350110
Dec. 14, 2000 (JP) .................................... 2000-380799
Oct. 26, 2001 (JP) .................................... 2001-329326

(51) Int. Cl.[7] .............................................. F03G 15/00
(52) U.S. Cl. ......................... 347/131; 347/140; 399/12; 399/38
(58) Field of Search ................................ 347/131, 140; 399/12, 43, 46, 38, 53; 358/1.9, 3.26, 3.27

(56) References Cited

U.S. PATENT DOCUMENTS

| 4,967,211 | A | 10/1990 | Colby et al. ............... 347/131 |
| 5,272,503 | A | 12/1993 | LeSueur et al. ............ 399/25 |
| 5,589,918 | A | 12/1996 | Oshida et al. ............ 399/114 |
| 5,682,574 | A | 10/1997 | Oshida et al. ............ 399/64 |
| 5,887,222 | A | 3/1999 | Sako ........................ 399/26 |
| 6,026,253 | A | 2/2000 | Domon et al. ............ 399/30 |
| 6,044,204 | A | 3/2000 | Takamatsu et al. ........ 358/1.9 |
| 6,343,193 | B1 | 1/2002 | Matsumoto et al. ........ 399/27 |

FOREIGN PATENT DOCUMENTS

JP          9-85993           3/1997

*Primary Examiner*—Joan Pendegrass
(74) *Attorney, Agent, or Firm*—Fitzpatrick, Cella, Harper & Scinto (57) ABSTRACT

When a user changes a density adjusting value (developing contrast), and even when variations in the usage state of process characteristics (of the photosensitive body and the developing device) of the cartridge change, the amount of recording agent consumed can be suppressed to be low, and a sharp line image can be recorded. An image forming apparatus of this invention includes an edge detecting portion for detecting an edge of image data, an image data correcting portion for correcting image data inside the edge so as to decrease its density, a laser driving circuit for forming an electrostatic latent image on a photosensitive body, and a correction value determining table for acquiring an instruction value for giving an instruction to correct a density contrast, wherein a correction condition for image data changes in accordance with an instruction value.

9 Claims, 10 Drawing Sheets

DENSITY CORRECTION VALUE TABLE

FIG. 8

RESULT OF COMPARING EXPERIMENT

| | IMAGE DENSITY ADJUSTING VALUE | 5 (DARK) | 3 (MEDIUM) | 1 (LIGHT) |
|---|---|---|---|---|
| EMBODIMENT | CORRECTION VALUE TABLE: HT(%) | 60 | 80 | 100 |
| | HEIGHT OF TONER (μm) | 12 | 11 | 10 |
| | SMEARED IMAGE TRAILING EDGE/IMAGE QUALITY | GOOD/GOOD | GOOD/GOOD | GOOD/GOOD |
| COMPARATIVE EXAMPLE | CORRECTION VALUE TABLE: HT(%) | 80 | 80 | 80 |
| | HEIGHT OF TONER (μm) | 16 | 11 | 6 |
| | SMEARED IMAGE TRAILING EDGE/IMAGE QUALITY | FAIL/GOOD | GOOD/GOOD | GOOD/FAIL |
| NONE (CONVENTIONAL) | CORRECTION VALUE TABLE: HT(%) | NONE (100) | NONE (100) | NONE (100) |
| | HEIGHT OF TONER (μm) | 22 | 15 | 10 |
| | SMEARED IMAGE TRAILING EDGE/IMAGE QUALITY | FAIL/GOOD | FAIL/GOOD | GOOD/GOOD |

MEMORY DEVICE FOR AN IMAGE FORMING APPARATUS STORING CHARACTERISTICS INFORMATION ABOUT A PROCESS CARTRIDGE DETACHABLY ATTACHABLE TO THE APPARATUS

CROSS REFERENCE TO RELATED APPLICATIONS

This application is divisional of 09/986,564, filed Nov. 9, 2001, now U.S. Pat. No. 6,532,030, issued Mar. 11, 2003.

BACKGROUND OF THE INVENTION

1. Field of the Invention

The present invention relates to an image forming method and apparatus and, more particularly, to an electrophotographic image forming apparatus such as a laser beam printer or copying machine, a control method therefor, and a process cartridge.

2. Related Art

Image forming apparatuses for forming images on the basis of image signals sent from host computers include various types of apparatuses, e.g., electrophotographic, ink-jet, and thermal image forming apparatuses.

Recently, of these apparatuses, electrophotographic image forming apparatuses have become greatly popular because of their advantages, e.g., high printing speed, high image quality, quietness.

For example, an electrophotographic image forming apparatus based on a laser exposure scheme includes an image forming circuit for converting image data sent from a host computer into bitmap data, and an image signal generating means for generating a laser ON/OFF signal on the basis of the bitmap data. This laser ON/OFF signal is input to a laser driving circuit to drive a semiconductor laser diode so as to emit light, thereby exposing a photosensitive body surface and forming an image thereon.

When the photosensitive body surface is irradiated with a laser beam corresponding to image data, an electrostatic latent image is formed. This image is developed and visualized by toner (recording agent). The visualized toner image is transferred onto a recording sheet and fixed by a fixing apparatus. In this manner, a user can obtain a desired image.

Image density adjustment, e.g., changing the thickness of a character in accordance with user's preferences, is performed by changing the developing contrast obtained by the developing apparatus.

If, however, a line image is printed, a portion corresponding to black image data has a so-called mountain-like cross-section. That is, the height of toner deposited on end portions of this line image portion is small, whereas the height of toner deposited on a central portion is large. This poses the following problems.

(1) The first problem is the phenomenon of a smeared image trailing edge in which the moisture contained in a paper sheet vaporizes when it passes through the fixing apparatus, and the water vapor is trapped in a portion where the height of toner is large. As a result, the toner bubbles over.

(2) The second problem is the occurrence of a solid image loss defect, which is caused when the toner on a line portion is pressed against the photosensitive drum by the pressing force of the transfer roller.

(3) The third problem is the offset phenomenon, a phenomenon in which toner cannot be completely fused because of an excessive amount of toner fed into the fixing apparatus, and toner is peeled off from a recording sheet by the fixing roller.

(4) A fourth problem is a deterioration in sharpness of a character that is caused when the toner of a character is smashed by the pressing force of the fixing roller because of its large height, and the contour position moves.

(5) The fifth problem is scattering of a character portion, which is caused when the amount of charge is small relative to the amount of toner developed because the developed toner image has difficulty in being faithfully influenced by a transfer electric field.

Under the circumstances, a printing method of decreasing the amount of toner consumed by decreasing the height of toner in printing a line image is disclosed in Japanese Patent Application Laid-Open No. 9-085993. In this method, the density data of the contour portion of a line image is used without any change, but the density data of an inner portion is corrected into low-density data, thereby decreasing the height of toner on a central portion of the line.

In the printing method disclosed in the above reference, however, when a user changes a density adjusting value (developing contrast) for the purpose of image density adjustment, line width adjustment, or the like, image data correction processing cannot be satisfactorily performed, resulting in the following problems. If image data is adjusted to a high image density to increase the line width, since the height of toner also increases, a sufficient decrease in the height of toner cannot be attained due to insufficient thinning-out. This may cause image problems (1) to (5). In contrast to this, if image data is adjusted to a low image density, since the height of toner also decreases, the height of toner excessively decreases due to excessive thinning-out, resulting in a poor line image.

In addition, since variations in line width occur due to variations of photosensitive bodies of process cartridges and developing characteristics and changes in the number of printing operations in the cartridges, when the line width is large, the height of toner does not decrease sufficiently due to insufficient thinning-out. This may cause problems like problems (1) to (5) described above.

On the other hand, if the line width is small, the height of toner decreases too much due to excessive thinning-out, resulting in an unclear line image. As described above, variations of process cartridges lead to inappropriate image data correction processing.

SUMMARY OF THE INVENTION

The present invention has been made in consideration of the above problems, and has as its object to provide an image forming apparatus, a control method therefor, and a process cartridge which can suppress the amount of toner consumed in forming a visible image low, and form a good image by recording even a line image sharply while reducing scattering, smeared image trailing edges, offsets, hollow defects, and the like even when a user changes a density adjusting value (developing contrast) for the purpose of image density adjustment, line width adjustment, or the like, or even due to variations in cartridges, the number of printing operations, and the amount of toner used.

According to the present invention, there is provided an image forming apparatus comprising: detecting means for detecting an edge of image data; image data correcting means for correcting the image data inside the edge detected by the detecting means so as to decrease a density of the image data; forming means for forming an electrostatic latent image on a photosensitive body on the basis of the corrected image data; acquiring means for acquiring an instruction value for giving an instruction to correct a density contrast; and developing means for developing the electrostatic latent image formed on the photosensitive body on the basis of the instruction value acquired by the acquiring means, wherein a correction condition for image data corrected by the image data correcting means changes in accordance with the instruction value acquired by the acquiring means.

In addition, according to the present invention, there is provided an image forming apparatus in which a process cartridge formed by integrating process elements including a photosensitive drum into a unit is detachably attachable, comprising: detecting means for detecting an edge of image data; image data correcting means for correcting the image data inside the edge detected by the detecting means so as to decrease a density of the image data; and forming means for forming an electrostatic latent image on a photosensitive body on the basis of the corrected image data, wherein the process cartridge includes storage means for storing information about the process cartridge, and wherein a correction condition for image data corrected by the image data correcting means changes in accordance with the information stored in the storage means.

Furthermore, according to the present invention, there is provided an image forming apparatus in which a process cartridge formed by integrating process elements including a photosensitive drum into a unit is detachably attachable, comprising: correcting means for correcting image data; forming means for forming an electrostatic latent image on a photosensitive body included in the process cartridge on the basis of the image data corrected by the correcting means; and acquiring means for acquiring an instruction value for giving an instruction to correct a density contrast; wherein the process cartridge includes storage means for storing information about the process cartridge, and wherein the image data correcting means corrects image data on the basis of the instruction value acquired by the acquiring means and the information stored in the storage means.

Moreover, according to the present invention, there is provided an image forming method of forming an image on a photosensitive body included in a process cartridge formed by integrating process elements into a unit, comprising: an image data correcting step of correcting image data; a forming step of forming an electrostatic latent image on the photosensitive body included in the process cartridge on the basis of the image data corrected in the correcting step; and an acquiring step of acquiring an instruction value for giving an instruction to correct a density contrast, wherein the process cartridge includes storage means for storing information about the process cartridge, and wherein in the image data correcting step, the image data is corrected on the basis of the instruction value acquired in the acquiring step and the information stored in the storage means.

The above and other objects, features, and advantages of the present invention will be apparent from the following detailed description in conjunction with the accompanying drawings and the appended claims.

DETAILED DESCRIPTION OF THE PREFERRED EMBODIMENTS

Embodiments of the present invention will be described in detail below with reference to the accompanying drawings.
(First Embodiment)

Figure 1:
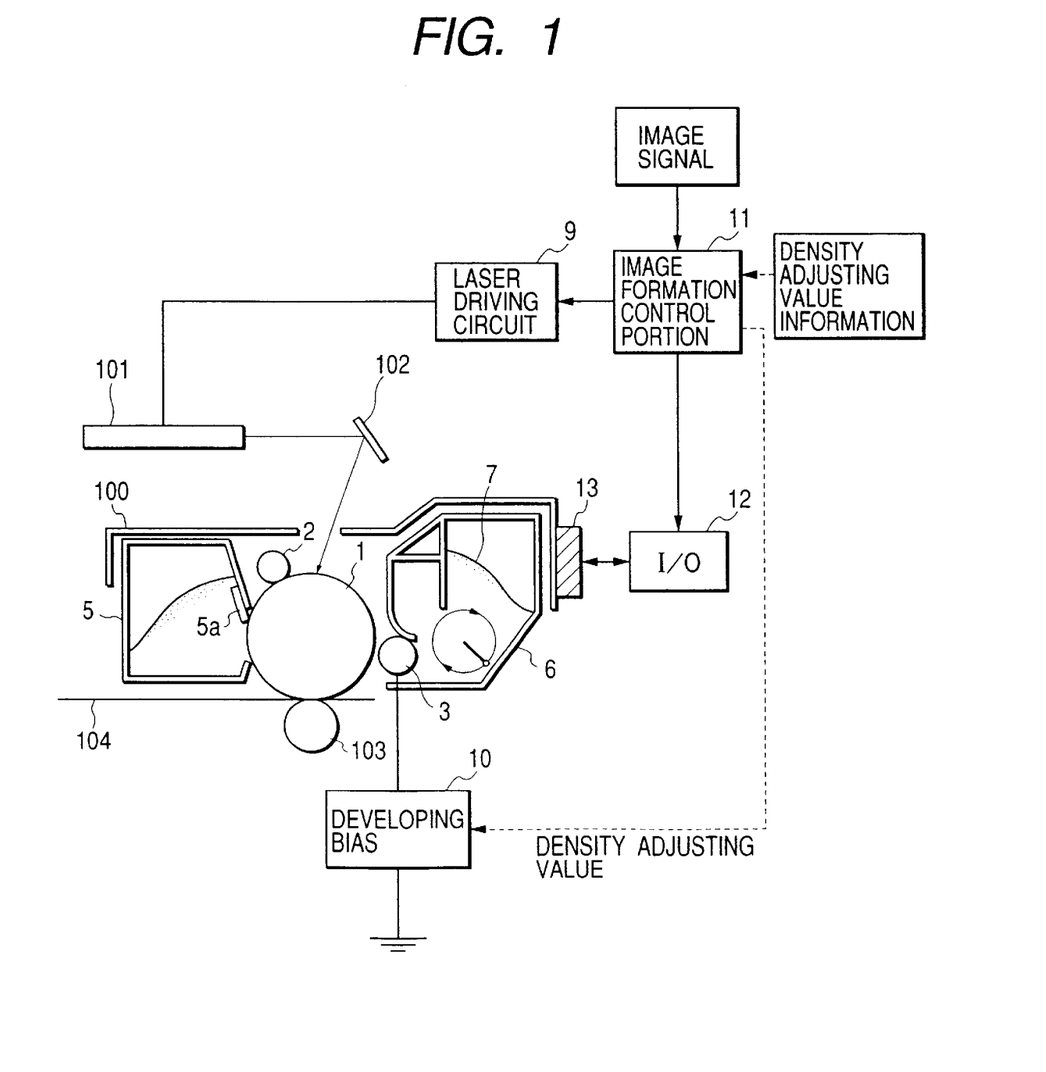
FIG. 1 is a view showing the arrangement of the main part of an image forming apparatus to which the present invention can be applied.
Figure 2:
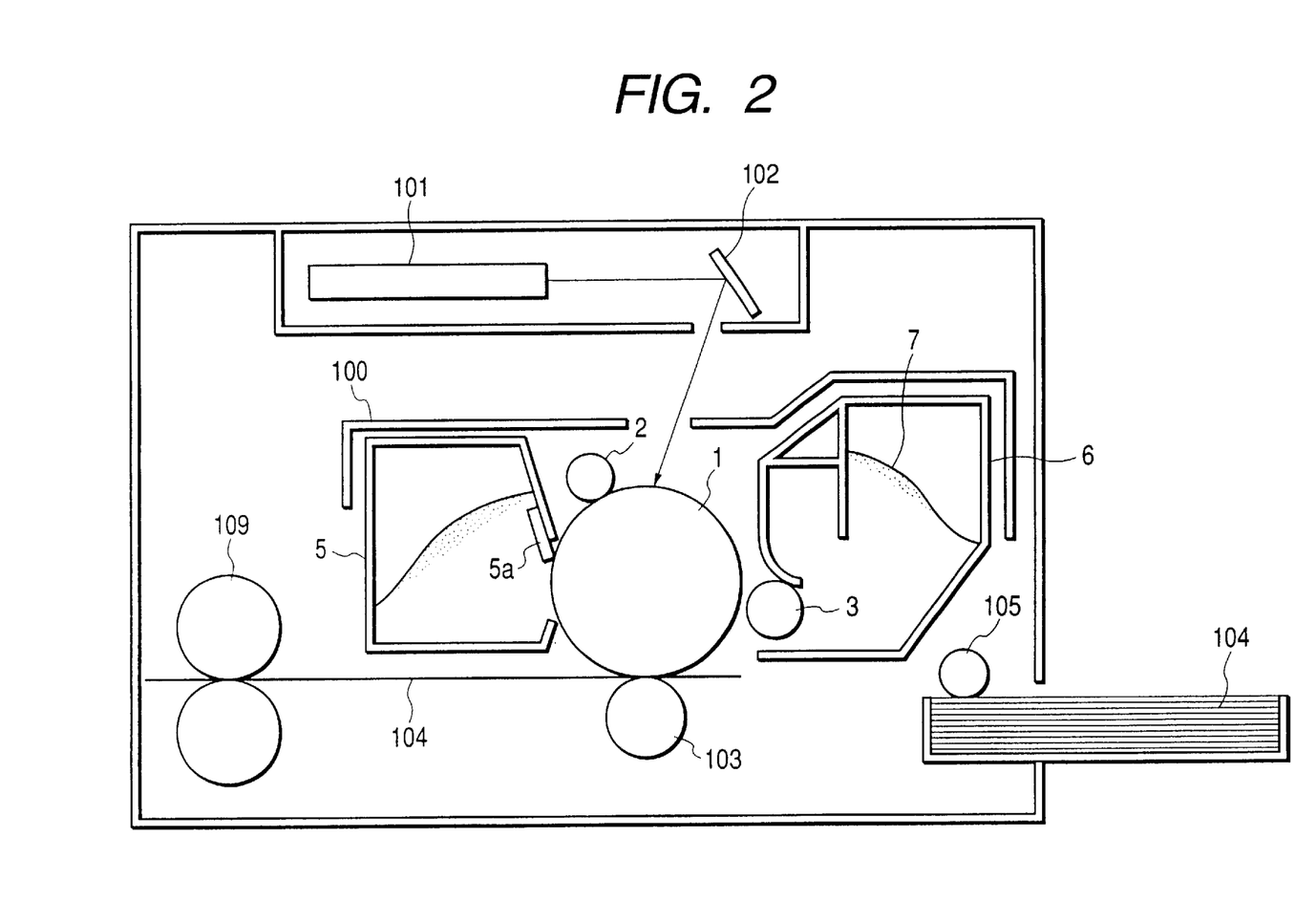
FIG. 2 is a schematic sectional view of the image forming apparatus to which the present invention can be applied.

FIG. 1 is a schematic sectional view of an image forming apparatus to which the present invention can be applied. FIG. 2 shows the arrangement of the main part of the apparatus.

The arrangement of the main part of the electrophotographic image forming apparatus according to the present invention will be described first. From the viewpoint of an electrophotographic process, the image forming apparatus is roughly comprised of a charging apparatus, an image carrier, an exposing apparatus, a developing apparatus, a transferring apparatus, a cleaning apparatus, and a fixing apparatus.

Referring to FIGS. 1 and 2, a photosensitive drum 1 has a cylindrical shape and serves as a latent image bearing member. After the surface of the photosensitive drum 1 is uniformly charged by a charging apparatus 2, a latent image is formed on the surface by an exposing apparatus 101. Assume that in this embodiment, a 600 dpi image is formed on this drum. The surface of the photosensitive drum 1 is uniformly charged to a charging potential Vd=−700 V. A potential Vl of a solid black portion (laser exposed portion) on the drum surface becomes −100 V after the drum surface is irradiated with a laser beam and surface charge is removed. The latent image formed on the photosensitive drum 1 by a laser beam is visualized by supplying toner serving as a developer to the drum surface using a developing apparatus 6. The developing apparatus 6 holds a toner layer in the form of a thin layer on the surface of a developing sleeve (developer carrying member) 3, and places the toner layer held in the form of a thin layer in a noncontact state with respect to the photosensitive drum 1. The developing apparatus 6 then applies a developing bias 10 obtained by superimposing a DC voltage on an AC voltage to the developing sleeve 3 to make the toner fly to the photosensitive drum 1, thereby performing reversal developing of the potential VI portion on the photosensitive body 1.

A transferring apparatus 103 transfers the toner image on the photosensitive drum 1, which is visualized by the developer in this manner, onto a sheet-like transferring/recording material 104, e.g., a recording sheet, fed by a sheet feeding roller 105. The visible image transferred onto the transferring/recording material 104 is conveyed to a fixing apparatus (fixing roller) 109, together with the transferring/recording material 104, and is fixed by heating or pressing, thereby obtaining a final recorded image.

The developer that is left on the photosensitive drum 1 without being transferred onto the transferring/recording material 104 in the transfer step is removed from the surface of the photosensitive drum 1 by a cleaning apparatus 100 having a blade 5. Thereafter, the surface of the photosensitive drum 1 is charged again by the charging apparatus 2, and the image forming process based on the above electrophotographic process is repeated.

The exposing apparatus 101 is comprised of a laser diode, a collimator, an Fθ lens, and a polygon mirror (none of which are shown). An image formation control portion 11 generates a laser ON/OFF signal on the basis of an image signal input from a host computer (not shown). A laser driving circuit 9 operates on the basis of this laser ON/OFF signal to drive the laser diode in the exposing apparatus 101 so as to emit light. As a consequence, the photosensitive drum 1 is irradiated with the laser beam through a reflecting mirror 102 in accordance with the image signal. The developing bias source 10 applies a developing bias voltage corresponding to a density adjusting value to the developing sleeve 3.

Figure 4:
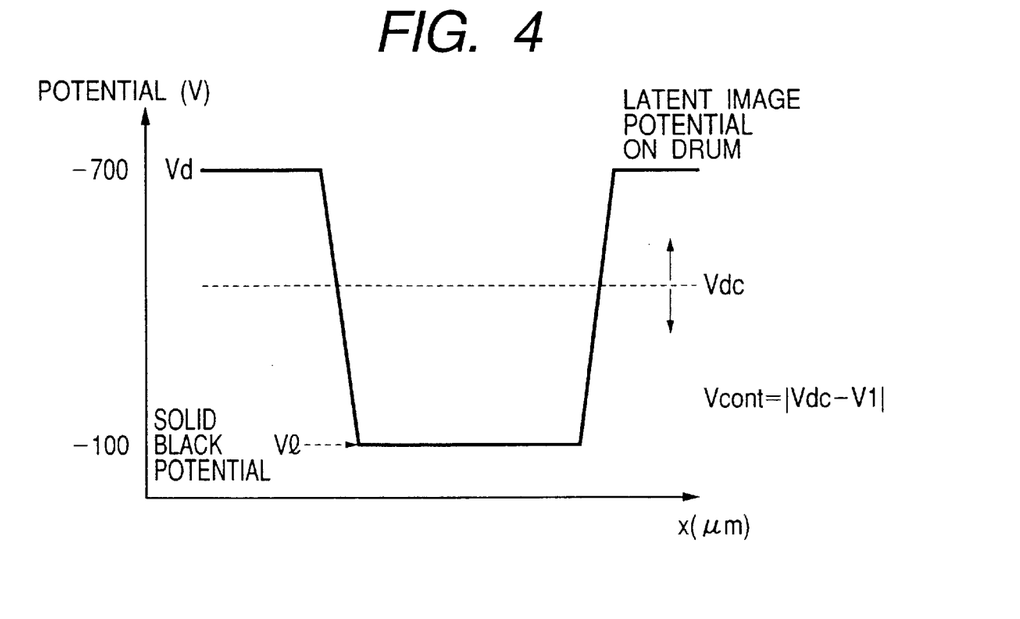
FIG. 4 is a graph showing the relationship between the developing bias and the latent image potential of a line image on a photosensitive drum according to an embodiment of the present invention.

Image density adjustment will be described below. FIG. 4 is a graph showing the relationship between the latent image potential of a line image on the photosensitive drum (ordinate) and a developing bias Vdc. The abscissa represents a line width x ($\mu$m).

Figure 5:
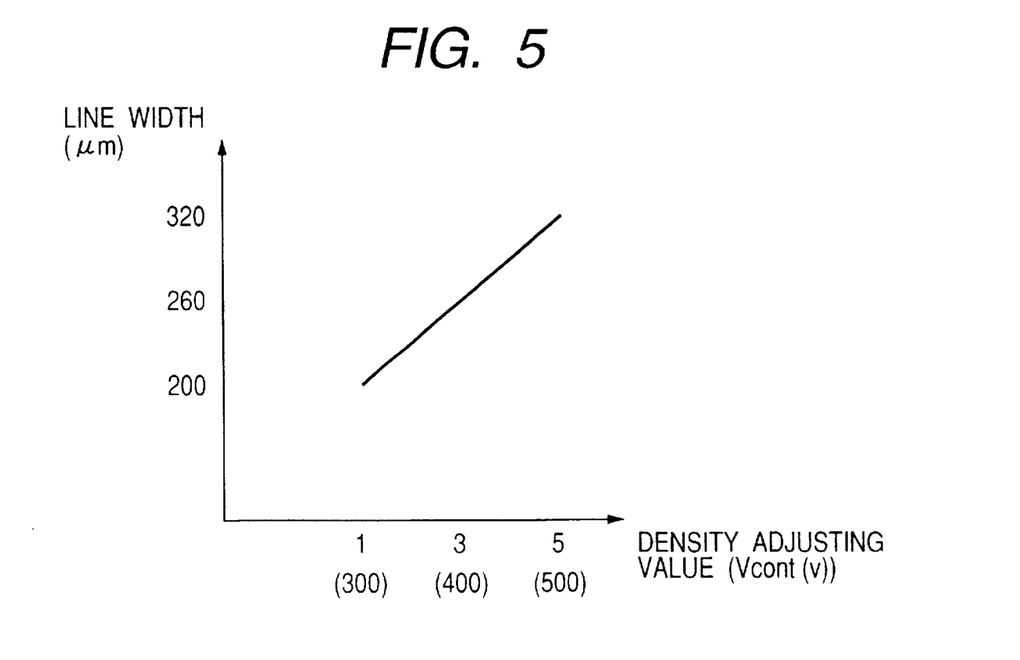
FIG. 5 is a graph showing the relationship between the density adjusting value (Vcont) and the line width according to an embodiment of the present invention.

A developing contrast potential Vcont applied to the developing apparatus 6 is represented by |Vdc−VI|. FIG. 5 is a graph showing the relationship between the developing contrast potential Vcont (abscissa) and the line width (ordinate) of a line image with a resolution of 600 dpi and a line width of 6 dots. Assume that the density adjusting value "1" corresponds to Vcont=300 (V), the density adjusting value "3" corresponds to Vcont=400 (V), and the density adjusting value "5" corresponds to Vcont=500 (V). The line width can be changed in the manner shown in FIG. 5 and a desired image can be obtained by changing the developing contrast potential Vcont in accordance with this density adjusting value.

Figure 6:
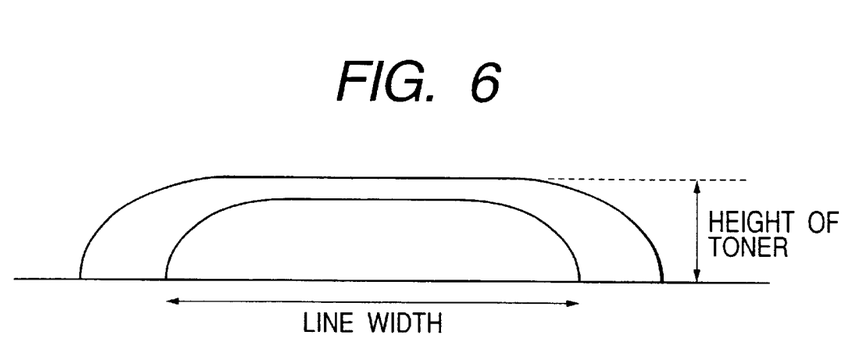
FIG. 6 is a view for explaining changes in the height of toner of a line image with changes in the developing contrast position according to an embodiment of the present invention.

If the developing contrast potential Vcont is changed, the line image undergoes a change in the height of toner as well as the line width, and the height of toner increases with a rise in the developing contrast potential Vcont, as shown in FIG. 6. This is because as the developing contrast potential Vcont rises, the developing electric field increases, and the developing efficiency improves.

Figure 3:
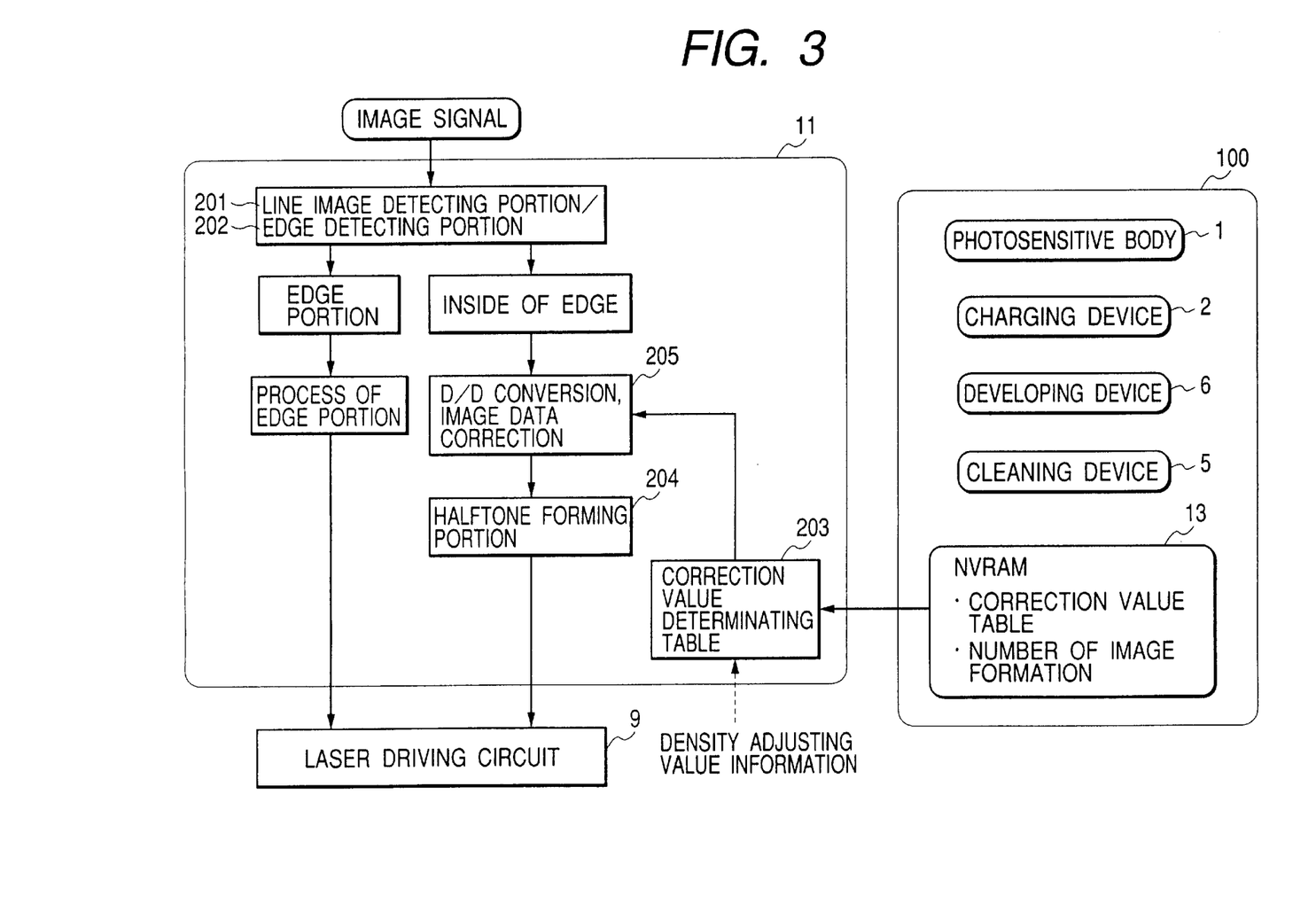
FIG. 3 is a block diagram showing the internal arrangement of an image forming control portion which is the main part of an embodiment of the present invention and is a most characteristic portion.

The most characteristic feature of the image forming apparatus according to this embodiment of the present invention will be described in detail below with reference to the block diagram of FIG. 3. FIG. 3 shows the details of the internal arrangement of the image formation control portion 11 in FIG. 1. With this arrangement, a line image with a small height of toner can be printed. Assume that in this embodiment, image processing is performed for a line image with a line width of about 100 to 500 $\mu$m (3 to 12 dot line at 600 dpi).

First of all, a line image detecting portion 201 has a window larger than a target line dot to detect a line image. Subsequently, in this embodiment, an edge detecting portion 202 detects a line image. This operation can be implemented by forming the edge detecting portion 202 using a linear differential circuit or a quadratic differential circuit. For example, a high-density portion and low-density portion in the window are detected. If the difference is equal to or larger than a predetermined value, the pixel of interest is determined as an edge portion.

The image data of an edge portion detected by the edge detecting portion 202 is stored without any correction processing in D/D conversion. The image data inside the edge is corrected into multilevel image data by performing D/D conversion based on processing 205 to reduce the gray density while the density of an image printed on a transferring/recording material becomes almost equal to the density of an image before image data correction.

Figure 7:
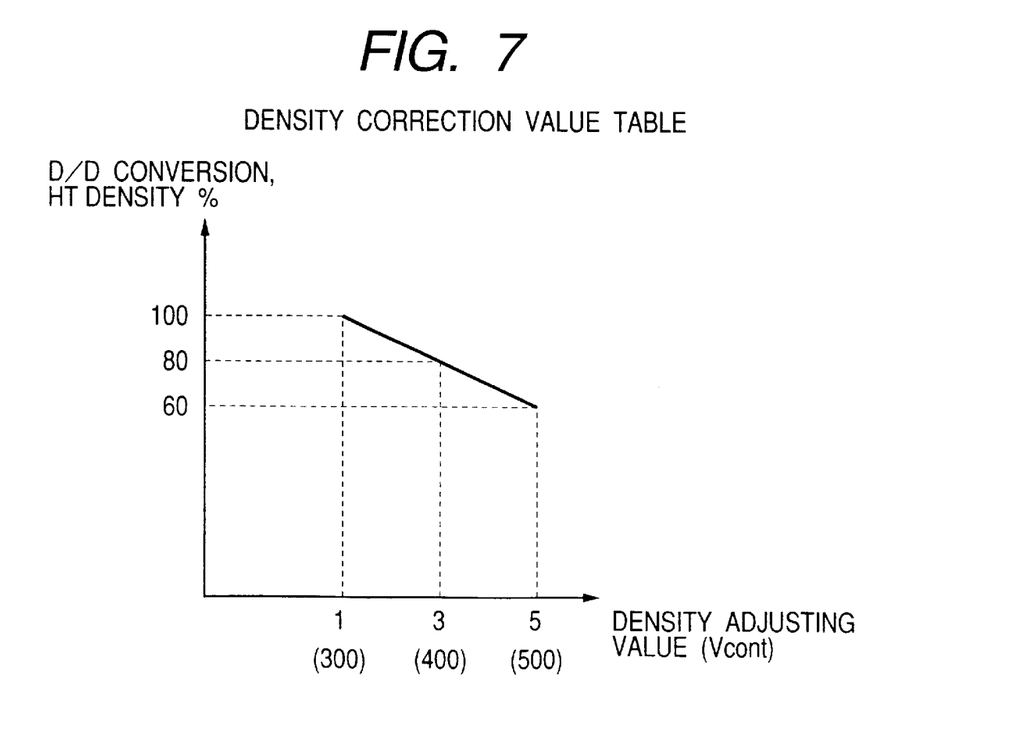
FIG. 7 is a graph showing the correspondence between the data correction values and the density adjusting values stored in a correction value determining table of the image forming control portion in FIG. 6 which is the most characteristic portion of the present invention.

A correction value in this image data correction is determined by using a correction value determining table 203 in which data correction values (D/D conversion HT densities) corresponding to external image density adjusting values are written in advance. Information indicating the relationship between the density adjusting value (abscissa) and the data correcting value (ordinate (%)) in FIG. 7 is stored in the correction value determining table 203 in advance.

After the D/D conversion portion 205 corrects the image data in accordance with this table, a laser ON/OFF signal is generated, which is properly corrected by a halftone forming portion 204 in accordance with the image density data after correction. The halftone forming portion 204 can use a halftone binarization forming scheme such as dithering or a PWM forming scheme using triangular waves. As a binarization method, (1) pattern dithering, (2) error diffusion, (3) halftone screening, or the like can be used.

In the image forming apparatus of the embodiment described above, if the density of image data on an outermost portion (e.g., an edge portion) of a line image is assumed to be 100%, all the image data of the outermost portion of the binarized line image become black regardless of the method used. Therefore, the sharpness of the edge portion is not lost in any case.

An experiment to verify the above effect was conducted by using the image forming apparatus according to this embodiment having the above arrangement.

D/D image conversion and image data correction were performed with respect to the portion inside the edge of the line image by using the correction value determining table 203 in which the data correction values having the relationship in FIG. 7 as the relationship between the image density adjusting values and the data correction values was written. In addition, in this experiment, a halftone image is formed by pattern dithering.

Figure 8:
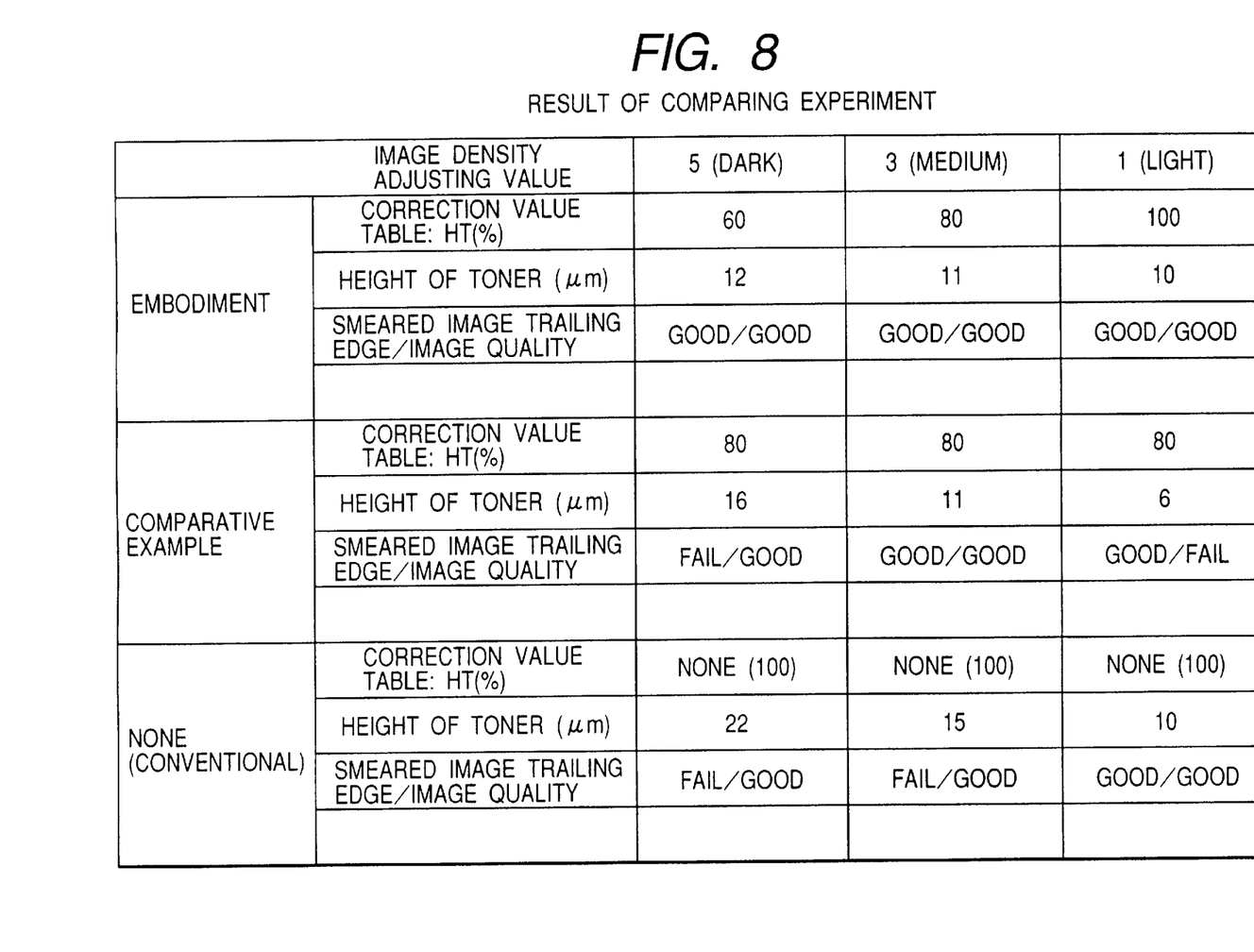
FIG. 8 is a view for explaining the results of print image printing experiments performed when image density adjustment is performed in an embodiment, a comparative example, and the conventional example.

FIG. 8 shows an experiment result on correction values, heights of toner, and image characteristics (smeared image trailing edge/image quality) when image density adjustment is performed in this embodiment, the comparative embodiment, and the conventional example (without correction).

In this experiment, the height of toner of each line image was measured as follows. A 600 dpi, 6 dot line was printed on OHT paper. This unfixed image was then temporarily fixed in an oven without pressure. The height of toner on the resultant image was measured by using a contact type surface roughness gauge. In addition, a "smeared image trailing edge" is the result obtained by printing a 600 dpi, 6 dot lateral line and evaluating it, and the "image quality" is the result obtained by evaluating the sharpness of each line image.

As is obvious from FIG. 8, without image processing, when the line width was adjusted to an appropriate value or increased (density adjusting value 3 to 5), the height of toner became large (15 μm or more), resulting in the problem of a smeared image trailing edge or the like. In the comparative example, data correction was uniformly made with an HT data density of 80%. In this case, an appropriate image could be obtained with a density adjusting value 3, but the problem of a smeared image trailing edge or the like arose with a density adjusting value 5. With a density adjusting value 1, the image quality deteriorated, e.g., the quality of the line image became poor.

In contrast to this, when the processing according to this embodiment was performed, by setting the image data correction value to appropriate values 100 to 60 in accordance with density adjusting values 1 to 5, the heights of toner on line images could be set within the appropriate range of 10 to 12 (μm) throughout the entire range of density adjusting values. This made it possible to print an appropriate image with a sharp contour without any smeared image trailing edge.

(Second Embodiment)

This embodiment is characterized in that variations in the height of toner due to the variations of process cartridges are corrected.

A characteristic feature of this embodiment will be described with reference to FIGS. 1 and 3.

A process cartridge 100 includes a nonvolatile memory 13 that can be renewed. In this embodiment, an NVRAM (Non Valid Random Access Memory) is used. However, the present invention is not limited to this. The main body has an information read/write means 12 for the nonvolatile memory 13 and is connected to an image formation control portion 11.

Referring to FIG. 3, a D/D conversion correction value is determined by using a correction value determining table 203 for determining a data correction value in accordance with the information stored in the nonvolatile memory 13. The correction value determining table contains the data correction values based on the information from the NVRAM 13 of the process cartridge 100.

The creation of a correction value determining table will be described next.

Figure 10:
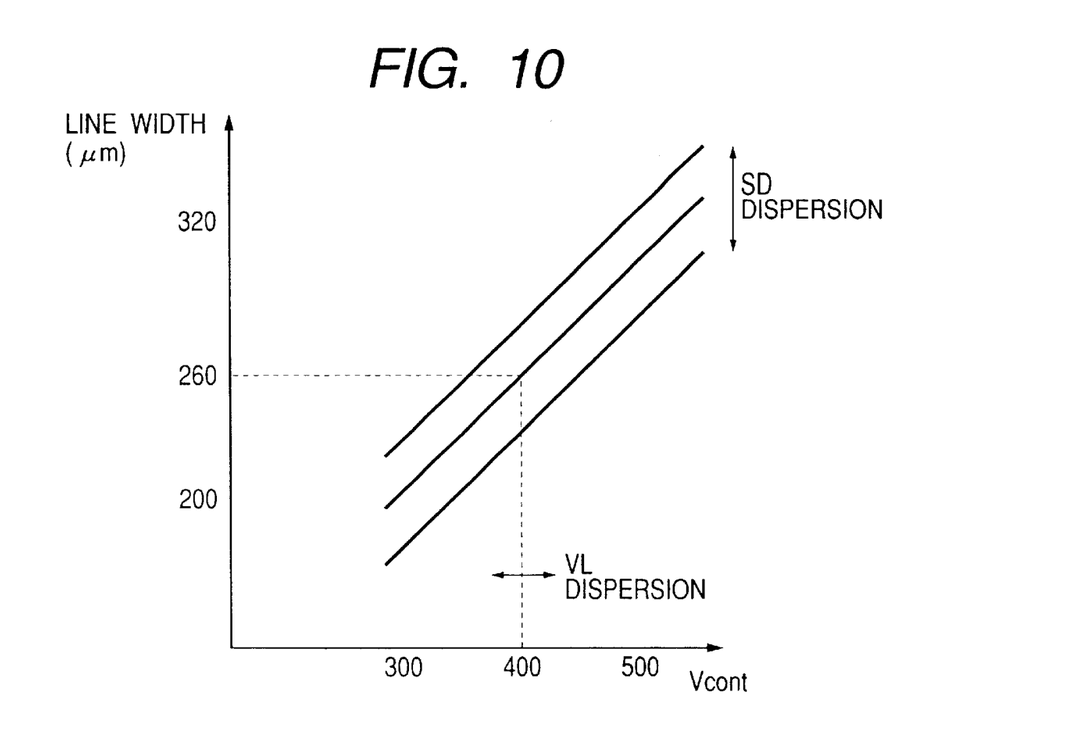
FIG. 10 is a graph showing the relationship between the developing contrast and the line width.

FIG. 10 is a view for explaining the relationship between the latent image potential of a line image and the developing bias. Assume that developing contrast $Vcont=|Vdc-VI|$. FIG. 5 is a view showing the relationship between the developing contrast and the 600 dpi, 6 dot line width. Variations in line width occur as indicated by the arrows due to variations of process cartridges, more specifically, variations in the sensitivity VI of the drum and SD of developing.

As shown in FIG. 7, as the line width changes, the height of toner changes. Therefore, correction is made to prevent the height of toner from changing too much even with a change in line width.

Figure 9:
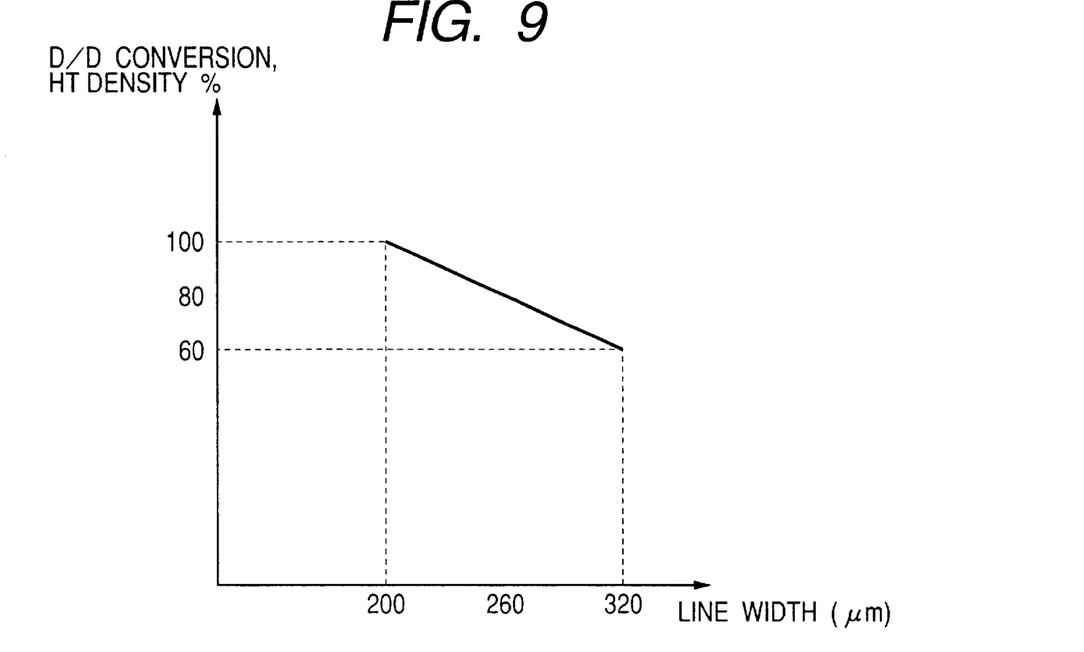
FIG. 9 is a graph showing the relationship between the line width and the HT density correction value according to the second embodiment.

A line width is estimated from the sensitivity VI of the drum of the process cartridge and the SD information of developing by using the relationship shown in FIG. 10, and an image density data correction value is obtained from the relationship shown in FIG. 9, thereby performing correction. FIG. 9 shows an appropriate relationship experimentally obtained such that the height of toner does not change much even with a change in line width.

An experiment was conducted to verify the effect of this embodiment by using the image forming apparatus of the above embodiment. A table was created from the relationship shown in FIGS. 4 and 5 to perform D/D conversion within an edge. In this embodiment, halftoning was performed by pattern dithering.

Table 1 shows results on image density adjusting values, the heights of toner, and image characteristics in this embodiment, a conventional example, and a comparative example.

In this case, the height of toner was measured as follows. A 600 dpi, 6 dot line was printed on OHT paper. This unfixed image was then temporarily fixed in an oven without pressure. The height of toner on the resultant image was measured by using a contact type surface roughness gauge.

Image quality (the sharpness of a line image) and a smeared image trailing edge were evaluated by printing a 600 dpi, 6 dot lateral line.

TABLE 1

|  |  | Line Width | | | | |
|---|---|---|---|---|---|---|
|  |  | 320 | | 260 | | 200 |
| Image Processing | | | | | | |
| Embodiment | Correction value: HT% | 60 | 70 | 80 | 90 | 100 |
|  | Height of Toner: μm | 12 | 11 | 11 | 11 | 10 |
|  | Smeared Image Trailing Edge/Image Quality | good/good | good/good | good/good | good/good | good/good |
| Comparative Example | Correction value: HT% | 80 | | 80 | 90 | 80 |
|  | Height of Toner: μm | 16 | 14 | 11 | 8 | 6 |
|  | Smeared Image | fail/good | fair/good | good/good | good/fair | good/fail |

TABLE 1-continued

|  |  | Line Width | | | | |
|---|---|---|---|---|---|---|
|  |  | 320 | | 260 | | 200 |
| None | Trailing Edge/Image Quality Correction value: HT% | none (100) | none (100) | none (100) | none (100) | none (100) |
|  | Height of Toner: μm | 22 | 18 | 15 | 12 | 10 |
|  | Smeared Image Trailing Edge/Image Quality | fail/good | fail/good | fail/good | good/good | good/good |

As is obvious from this result, without image processing, if the line width is large, the height of toner is large, and the problem of a smeared image trailing edge arises. In the comparative example, data correction is uniformly made with an HT data density of 80%. If the line width is large, the problem of a smeared image trailing edge arises. If the line width is small, a deterioration in image quality occurs, e.g., the line image quality becomes poor.

In contrast to this, in this embodiment, by setting an appropriate image data correction value in accordance with an estimated line width density adjusting value, the height of toner of a line portion could be set within a proper range in a wide range of line widths, thus obtaining an appropriate image.

In practice, variations in drum sensitivity and SD variations are classified into three levels, and HT densities are designated in accordance with the respective combinations.

TABLE 2

| Drum VL | H | H | M | M | H | L | M | L | L |
|---|---|---|---|---|---|---|---|---|---|
| SD | H | M | H | M | L | H | L | M | L |
| HT Density % | 70 | 75 | 75 | 80 | 80 | 80 | 85 | 85 | 90 |

Levels H, M, and L respectively represent settings in the direction of high sensitivity, near the center, and in the direction of low sensitivity. Pieces of drum VL and SD information are stored in the cartridge memory, and a data correction value is determined in accordance with the combination of level information.

In the jumping type device according to this embodiment, developing magnetic fields concentrate on a latent image electric field on the drum, and toner gathers from surrounding portions onto a line portion. When a latent image with a line width of about 100 to 500 μm is developed, the height of toner becomes higher than a solid black image by about 1.5 to 2 times. That is, toner tends to be excessively deposited. Therefore, the present invention is especially effective in this case.

As described above, according to this embodiment, by storing, in the storing element of a cartridge, an image data density correction table most suitable for the characteristics of the cartridge, an image forming apparatus can always perform image data density correction most suitable for the characteristics of the cartridge in use.

Although VL and SD values are used to optimize the density correction table, parameters that are associated with line width and can be measured in the process of manufacturing a cartridge, e.g., developing blade settings, the surface roughness of a developing sleeve, and the magnetic force of a magroller.

This embodiment has exemplified the process cartridge type apparatus integrally incorporating a developing apparatus and photosensitive body. However, this embodiment can be applied to an image forming apparatus having separate developing units. In this case, for the developing units, storing elements storing image data density correction tables optimized in consideration of the characteristics of the respective units may be provided.

(Third Embodiment)

A characteristic feature of this embodiment is that information about a usage history (log), e.g., information of the number of sheets and toner amount information, is stored in the memory of a process cartridge in addition to process characteristic information, and a data correction table is created from these two kinds of information.

As the cartridge is used, the line width may change because of changes in the state of a developer and the drum sensitivity. The tendency of line change with time is determined by the system of an image forming apparatus.

When a durability test is performed by using the image forming apparatus according to the first embodiment, the line width changes with time as shown in FIG. 8. Since the line width increases with time, the height of toner excessively increases. Therefore, HT density data is corrected in accordance with information about the number of sheets printed using the current cartridge.

In this embodiment, the processing shown in the flow chart of FIG. 9 is performed, and a data correction value is changed to an appropriate value at intervals of 500 prints. First of all, at the start of use of a cartridge, data correction value information is read out from the NVRAM of the cartridge by a read means. An image is formed in accordance with this value (step S1). Information of the number of sheets is sent to the NVRAM of the cartridge to renew cumulative count information. If the number of sheets is 500n (step S2), a data correction value table is read out by the read means of the image forming apparatus main body (step S3) and stored in a storing element mounted in the apparatus main body (step S4). Thereafter, an image is formed (step S5). With this operation, the image forming apparatus can have a data correction value table most suitable for the characteristics of the cartridge (step S6). If the number of sheets is not 500n (step S2), an image is formed without performing this operation (step S5).

Figure 11:
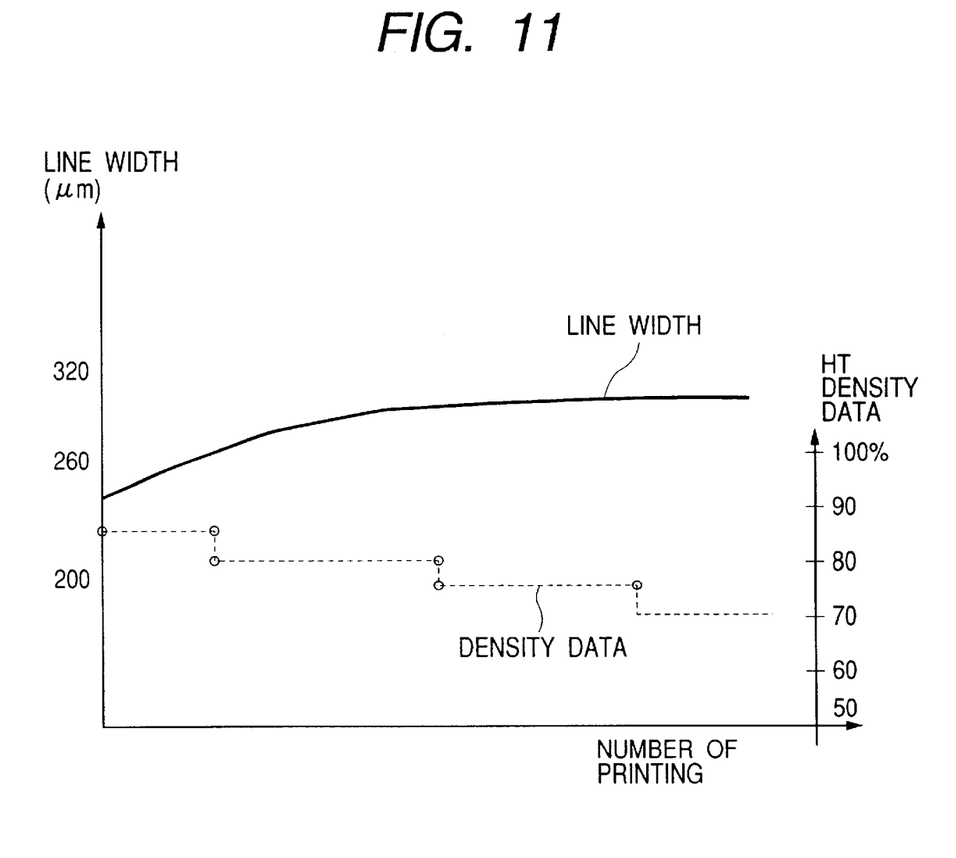
FIG. 11 is a graph showing changes in line width with time.
Figure 12:
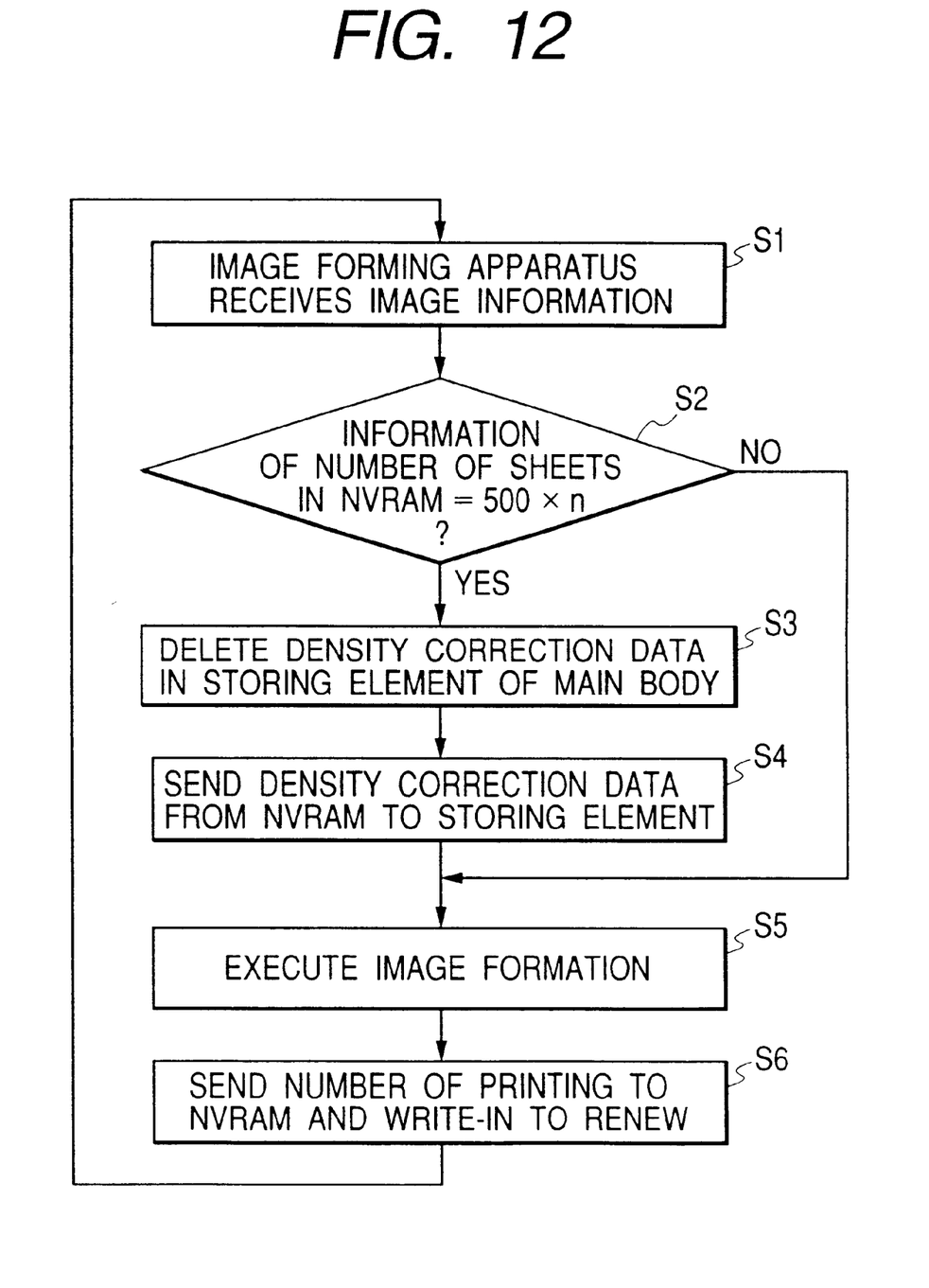
FIG. 12 is a flow chart for correction value renewing processing according to the third embodiment.

In this embodiment, as indicated by the dotted line in FIG. 11, the HT density data is corrected to smaller values in accordance with the number of sheets. According to the above description, the data correction value is changed in accordance with the number of sheets in the cartridge. However, the correction value may be changed in accordance with information of the amount of toner used.

Toner tends to be used from toner particles having a small particle size. According to the relationship between the particle size and the height of a line image, as the particle size increases, the height of toner increases even with a constant line width. A better effect can therefore be obtained by changing an HT data correction value in accordance with the information of the amount of toner used. Note that the information of the amount of toner used is estimated by a toner level detecting means, a pixel count accumulating method, and the like.

According to this embodiment, as described above, by storing the characteristic information of a cartridge, the number of printing operations, and information of the amount of toner used, in the storing element of the cartridge, the image forming apparatus can always perform image data density correction most suitable for the characteristics of the cartridge in use.

(Fourth Embodiment)

A characteristic feature of this embodiment is that the HT density of line image data is corrected by using both the information in the memory of a cartridge and image density adjusting value information. The arrangement of this embodiment is the same as that described in each of the first to third embodiments.

Figure 13:
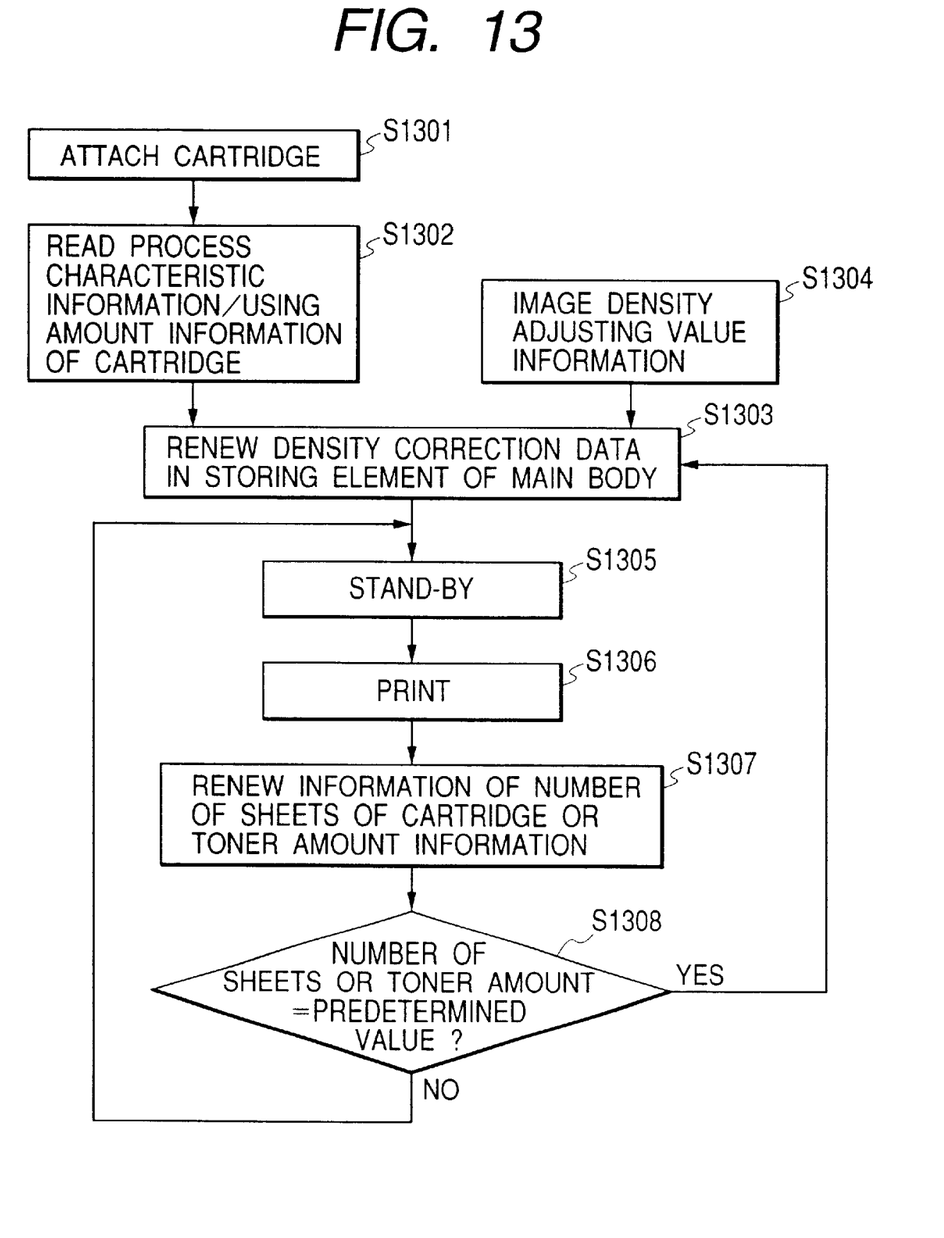
FIG. 13 is a flow chart for correction value renewing processing according to the fourth embodiment.

In this embodiment, a data density correction value is changed to an appropriate value by performing the processing shown in the flow chart of FIG. 13.

First of all, when the cartridge is attached, a read means reads out process characteristic information (VL, SD, and the like) and cartridge using amount information (the number of sheets or toner using amount information) from the NVRAM of the cartridge. In addition, the density correction data in the main body is renewed from the image density adjusting value information.

To determine a density data correction value on the basis of the process information of the cartridge, using amount information, and image density adjusting value information, an appropriate value is determined by adding or integrating the density values of the respective tables.

After printing, the number of printing operations or toner amount information is sent to the NVRAM to renew the information.

If the number of printing operations or the toner amount becomes a predetermined value, the line data density correction value in the main body is renewed.

With this operation, a data correction value table most suitable for the characteristics of a cartridge and the image density adjusting value in the main body can be obtained.

According to the above embodiment, there are provided an image forming apparatus and a control method therefor which can suppress the amount of toner consumed in forming a visible image low, and form a good image by recording even a line image sharply while reducing scattering, smeared image trailing edges, offsets, hollow defects, and the like even when a user changes a density adjusting value (developing contrast) for the purpose of image density adjustment, line width adjustment, or the like, or even when there are variations in cartridges, and the number of printing operations, and the even when amount of toner used changes.

The present invention has been described above by exemplifying several preferred embodiments. Obviously, however, the present invention is not limited to these embodiments, and can be variously modified and applied within the scope of claims.

What is claimed is:

1. A memory device for an image forming apparatus, wherein
said memory device is to be mounted on a process cartridge integrating at least one of a plurality of process elements and detachably attachable to the image forming apparatus,
said memory device stores characteristic information about the process cartridge, and
said memory device further stores correction condition information for correcting image data inside an edge of an image.

2. A memory device according to claim 1, wherein said memory device stores information about drum sensitivity for changing a correction condition for correcting the image data.

3. A memory device according to claim 2, wherein the density of the image data inside the edge of the image is decreased more significantly on the basis of information representative of a higher drum sensitivity as compared to the decrease of the density of the image data inside the edge of the image on the basis of information representative of a lower drum sensitivity.

4. A memory device according to claim 1, wherein said memory device stores information about SD variations for changing a correction condition for correcting the image.

5. A memory device according to claim 4, wherein the density of the image data inside the edge of the image is decreased more significantly on the basis of information representative of a higher SD value as compared to the decrease in density of image data inside the edge of the image on the basis of information representative of a lower SD value.

6. A memory device according to claim 1, wherein said memory device stores information about the usage history of the process cartridge.

7. A memory device according to claim 1, wherein said memory device stores information about the number of printing operations.

8. A memory device according to claim 1, wherein said memory device stores information about a toner amount.

9. A memory device according to claim 1, wherein the image data is corrected based on the correction condition information and an instruction value for giving instructions to correct the density of the image.

* * * * *